United States Patent [19]

Watanabe

[11] Patent Number: 5,165,085

[45] Date of Patent: Nov. 17, 1992

[54] STROKE END CHECKING APPARATUS FOR MACHINE TOOL OF NUMERICAL CONTROL

[75] Inventor: Naoki Watanabe, Aichi, Japan

[73] Assignee: Mitsubishi Denki K.K., Tokyo, Japan

[21] Appl. No.: 442,273

[22] Filed: Nov. 28, 1989

[30] Foreign Application Priority Data

Dec. 2, 1988 [JP] Japan .................................. 63-305696

[51] Int. Cl.$^5$ .................................................. G06F 15/46
[52] U.S. Cl. ........................... 364/474.16; 364/474.19; 364/184
[58] Field of Search ....................... 364/474.26, 474.29, 364/184, 185, 186, 188, 474.16, 474.19, 474.2, 474.24, 474.25, 191–193

[56] References Cited

U.S. PATENT DOCUMENTS

| | | | |
|---|---|---|---|
| 4,603,391 | 7/1986 | Inoue et al. | 364/474.35 |
| 4,646,247 | 2/1987 | Otsuki | 364/184 |
| 4,678,976 | 7/1987 | Inoue | 364/184 |
| 4,914,364 | 4/1990 | Hirai | 364/474.29 |
| 4,967,189 | 10/1990 | Sumita et al. | 364/474.16 |

FOREIGN PATENT DOCUMENTS

| | | |
|---|---|---|
| 217222 | 12/1983 | Japan . |
| 297022 | 12/1986 | Japan . |
| 297024 | 12/1986 | Japan . |

*Primary Examiner*—Jerry Smith
*Assistant Examiner*—Thomas E. Brown
*Attorney, Agent, or Firm*—Sughrue, Mion, Zinn, Macpeak & Seas

[57] ABSTRACT

A stroke end checking apparatus of a machine tool of numerical control stores an actual machine coordinates value of each of the table stroke ends on the basis of the machine reference point in detecting each of the table stroke ends which restrict a movement of the processing table in a two-dimensional direction. This apparatus also displays the relationship of the processing locus with the positions of the table stroke ends in the two-dimensional direction by the processing program of numerical control prior to actual processing on the basis of the machine corrdinates value. This enables the graphic stroke ends on the display screen to coincide with the corresponding table stroke ends, thereby permitting a rapid and accurate stroke end checking operation on the graphic display screen without the program checking operation which accompanies the transfer of the processing table in an axial direction. This apparatus also enables a highly reliable stroke end checking without allowing the processing locus of the processing table to interfere with the table stroke ends at the stage of actual processing. This arrangement can decrease working hour for preparation prior to actual processing and as a consequence improve working efficiency.

14 Claims, 9 Drawing Sheets

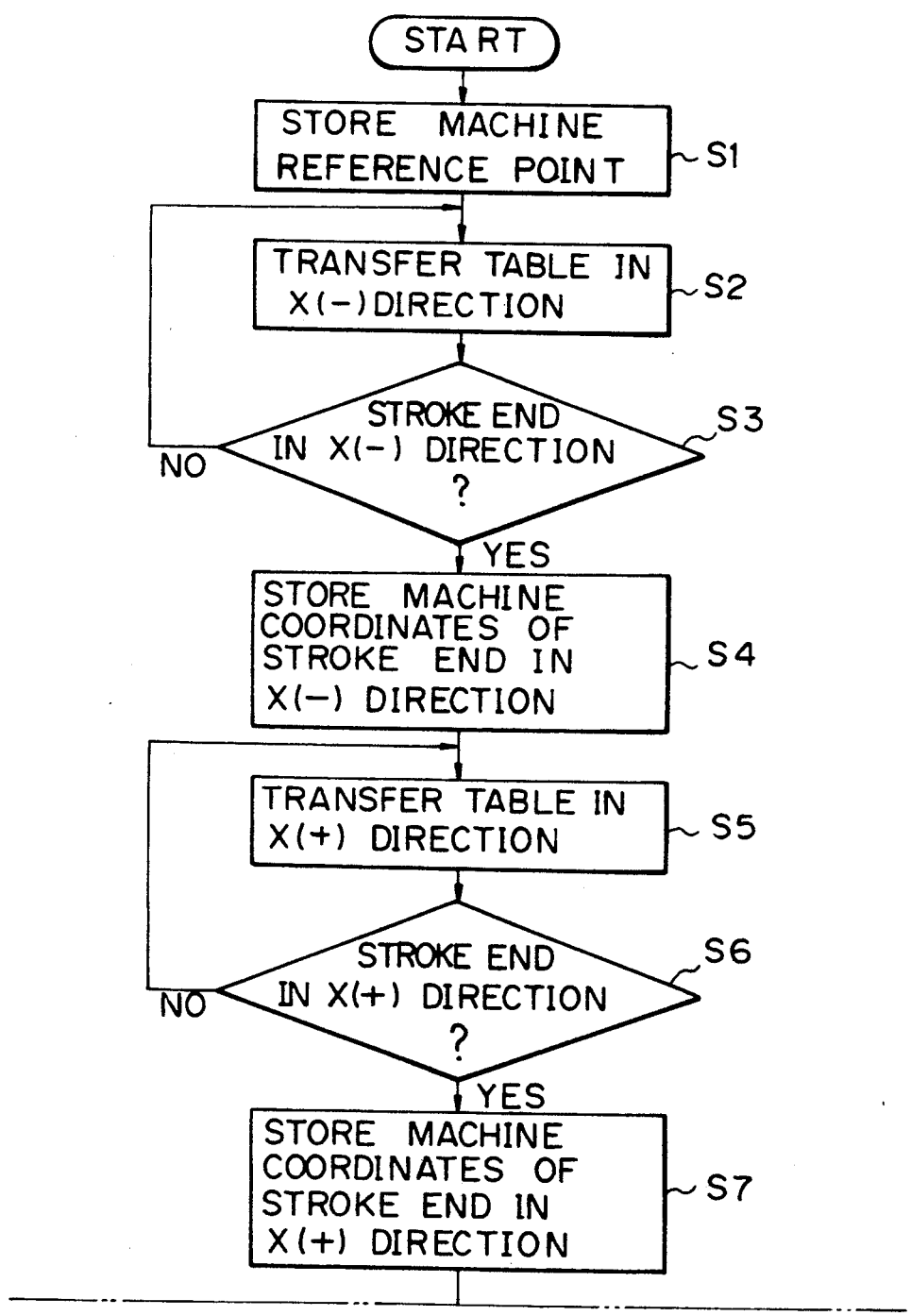

STROKE END CHECKING APPARATUS FOR MACHINE TOOL OF NUMERICAL CONTROL

BACKGROUND OF THE INVENTION

1. Field of the Invention

The present invention relates to a stroke end checking apparatus for a machine tool of numerical control and, more particularly, to a stroke end checking apparatus for a machine tool of numerical control, including an electric discharge machine, capable of judging the ability or inability of processing within an effective stroke region prior to actual processing.

2. Description of Prior Art

FIG. 1 is a block diagram showing an example of the structure of a stroke end checking apparatus of a machine tool of numerical control, and FIG. 5 represents the position relationship of machine coordinates with positions of table stroke ends by the stroke end checking apparatus of a conventional machine tool of numerical control.

As shown in FIG. 1, reference numeral 1 stands for a central processing unit for generating an instruction to execute a control program, to analyze a processing program, and to implement a desired processing, reference numeral 2 for a storage for storing the control program in order to control a whole system of a processing unit (hereinafter referred to as ROM), reference numeral 3 for a storage for storing the processing program and so on for numerical control (hereinafter referred to as RAM), reference numeral 4 for an operation panel through which an operator can provide a control unit with a variety of operations, reference numeral 5 for a tape for numerical control on which the processing program and so on are recorded (NC tape), reference numeral 6 for a tape reader for reading the content recorded on the tape for numerical control 5, and reference numeral 7 for a display unit for displaying the processing program, a variety of numerical data, graphic screens, and so on (hereinafter referred to as CRT). Reference numeral 8 stands for a pulse distributer for distributing into driving pulses a transfer amount in each of axial directions from an operation result of the central processing unit 1, reference numeral 9 for a servo unit in the X-axis direction, reference numeral 10 for a servo unit in the Y-axis direction, reference numeral 11 for a servo motor to be drivable in the X-axis direction by the servo unit 9, and reference numeral 12 for a servo motor to be drivable in the Y-axis direction by the servo unit 10. Furthermore, reference numeral 13 stands for a stroke end detector for generating a stroke end detecting signal to a control unit (not shown), reference alphanumeral 14a for a limit switch for detecting a stroke end in the X-axis plus direction, reference alphanumeral 14b for a limit switch for detecting a stroke end in the X-axis minus direction, reference alphanumeral 15a for a limit switch for detecting a stroke end in the Y-axis plus direction, and reference alphanumeral 15b for a limit switch for detecting a stroke end in the Y-axis minus direction.

Referring again to FIG. 5, reference numeral 21 stands for a machine reference point functioning as a reference in transferring a processing table, and reference numerals 22 and 23 stand for coordinate axes of a machine coordinates system determined on the basis of the machine reference point 21, in which reference numeral 22 denotes the coordinate axis in the X-axis direction and reference numeral 23 denotes the coordinate axis in the Y-axis direction. Reference numerals 24 to 27, inclusive, denote table stroke ends, in which reference numeral 24 denotes the table stroke end in the X-axis minus direction, 25 denotes the table stroke end in the X-axis plus direction, 26 denotes the table stroke end in the Y-axis minus direction, and 27 denotes the table stroke end in the Y-axis plus direction. Reference symbol (Xst) stands for a table stroke in the X-axis direction within a transferable scope in the X-axis direction of the processing table, reference symbol (Yst) for a table stroke in the Y-axis direction within a transferable scope in the Y-axis direction of the processing table, reference symbol (Lxs) for a distance between the machine reference point 21 and the table stroke end 24 in the X-axis minus direction, and reference symbol (Lys) for a distance between the machine reference point 21 and the table stroke end 27 in the Y-axis plus direction.

The stroke end checking apparatus for the conventional machine tool of numerical control has the structure as the conventional machine tool of numerical control has the structure as have been described hereinabove, wherein a scope within which the processing table can be transferred is restricted by the stroke ends 24, 25, 26 and 27 by detecting the stroke ends restricting the scope in which the processing table can be transferred in a two-dimensional direction—more specifically, in the X-axis direction and in the Y-axis direction. Thus, the processing table cannot be transferred beyond or outside the stroke ends. The conventional various machine tools including an electric discharge machine are designed such that the stroke ends are set in order to restrict an effective transfer range of the processing table.

Operation of the conventional stroke end checking apparatus of the machine tool of numerical control will be described hereinafter.

The central processing unit 1 executes the control program stored in the ROM 2 and analyzes the processing program, thereby outputting to the pulse distributer 8 an axial transfer signal that is the output result and, as a consequence, appropriately controlling the driving of the servo motors 11 and 12 through the servo units 9 and 10, respectively. When the stroke end signals LX+, LX−, LY+ and LY− are entered into the stroke end detector 13 from the limit switches 14a, 14b, 15a and 15b during the transfer in the axial directions, the stroke end detector 13 sends the stroke end detecting signals to the control unit (not shown) of the machine tool of numerical control, thereby immediately suspending the transfer in the axial directions of the machine tool. Accordingly, these apparatuses are devised such that, when the processing locus interferes with the stroke ends during actual processing, the transfer in the axial directions is suspended, whereby processing operation cannot be continued further so that materials being then processed become useless. Thus it is desirable to implement the stroke end checking prior to actual processing.

The stroke end checking operation to be implemented prior to actual processing will be described with reference to FIG. 6.

FIG. 6 represents the relationship of the position at which a material to be processed is mounted with a processing locus when a program is checked by transferring the conventional stroke end checking apparatus of the numerical control machine tool in axial directions.

As shown in FIG. 6, reference numeral 31 stands for a material to be processed; reference numeral 32 for a level block of the processing table; reference numeral 33 for a clamp for fixing the material to be processed 31 on the level block 32; reference numeral 34 for a processing start point, an opening of the material to be processed 31, from which the processing is started; reference numerals 35 to 39, inclusive, each for a processing locus segment on the basis of the processing program for numerical control; and reference numeral 40 for a stroke end interference point that is an intersection of the processing locus segment 36 with the table stroke end 26 in the Y-axis minus direction.

Referring to FIG. 6, the stroke end checking apparatus of the numerical control machine tool of this type is operated first by fixing the material to be processed 31 on the level block 32 with the clamp 33 and determining the position of a wire nozzle of an electric discharge machine from the processing start point 34, by executing the processing program for numerical control and transferring the processing table, and then by checking whether or not each of the processing locus segments 35, 36, 37, 38 and 39 is transferred beyond each of the table stroke ends 24, 25, 26 and 27. It is to be noted here that the processing table is merely transferred in axial directions without implementing actual processing. As shown further in FIG. 6, if the processing is transferred along the processing locus segment 36 and the locus segment would interfere with the stroke end interference point 40 at the table stroke end 26 in the Y-axis minus direction, the actual processing cannot be implemented in this situation. In this case, however, the material to be processed 31 should be fixed again on the level block 32 and then the stroke end checking operation for checking the stroke end should be carried out. The actual processing should be implemented after it has been confirmed that the processing locus segments 35, 36, 37, 38 and 39 do not interfere with each of the table stroke ends 24, 25, 26 and 27.

The stroke end checking operation will be described with reference to FIG. 7 which is a flow chart showing a stroke end checking routine to be executed by the conventional stroke end checking apparatus of the numerical control machine tool.

After the material to be processed 31 has been fixed on the level block 32 with the clamp 33, then at step S31, the tape reader 6 reads the content of the numerical control tape 5. The flow proceeds to step S32 where the processing table is transferred in the axial directions in order to implement the program check in accompany with the axial transfer of the processing table by the stroke end checking apparatus. Then at step S33, it is judged whether or not a series of the processing locus segments 35, 36, 37, 38 and 39 interfere with each of the table stroke ends 24, 25, 26 and 27. If they do not interfere with any table stroke ends, on the one hand, the flow proceeds to step S34 and the actual processing is started. If they do interfere with the table stroke end, the material to be processed 31 is fixed again on the level block 32 at step S35, and the flow goes back to step S32 where the stroke end checking operation is implemented with the processing table transferred in the axial directions, in the same manner as above.

It is to be noted that this stroke end checking operation requires the processing table to be actually transferred in the axial direction so that checking a complex design on the basis of a processing program requires an increased period of time, expenses, and labor. Accordingly, attempts have been made to use the CRT 7 for checking a program on the graphic screen in order to shorten a checking time and improve work efficiency.

The program checking operation using the graphic screens will be described with reference to FIG. 8.

FIG. 8 represents the position relationship of the machine coordinates on the graphic display screen associated with the conventional stroke end checking apparatus for the numerical control machine tool with positions of stroke ends including the table stroke ends and graphic stroke ends as will be described hereinafter. As shown in FIG. 8, reference numerals 21 to 27, inclusive, and reference symbols (Xst) and (Yst) are the same as or closely similar to those used in FIGS. 5 and 6, respectively, so that duplicate description on these reference numerals and symbols is omitted herefrom for brevity of explanation.

As shown in FIG. 8, reference numerals 41 to 44, inclusive, denote stroke ends on the display screen (hereinafter referred to as graphic stroke ends), in which reference numeral 41 stands for the graphic stroke end in the X-axis minus direction, reference numeral 42 for the graphic stroke end in the X-axis plus direction, reference numeral 43 for the graphic stroke end in the Y-axis minus direction, and reference numeral 44 for the graphic stroke end in the Y-axis plus direction. Reference numeral (Xgst) stands for a graphic stroke in the X-axis direction within a transferable scope in the X-axis direction on the display screen of the processing table and reference numeral (Ygst) for a graphic stroke in the Y-axis direction within a transferable scope in the Y-axis direction on the display screen of the processing table, as well as reference symbol (Lxgs) stands for a distance between the table stroke end 24 in the X-axis minus direction and the graphic stroke end in the X-axis minus direction and reference symbol (Lygs) for a distance between the table stroke end 27 in the Y-axis plus direction and the graphic stroke end 44 in the Y-axis plus direction.

Techniques of the checking programs using the CRT 7 in the manner as have been described hereinabove are known as disclosed, for example, in Japanese Patent Publication (kokai) Nos. 297,021/1986, 297,022/1986, and 297,024/1986. These techniques require that each of the graphic stroke ends 41, 42, 43 and 44 coincides fully with each of the table stroke ends 24, 25, 26 and 27, respectively. Thus the control program should be arranged in advance so as to specify in such a manner that the operator can actually transfer the processing table so as to reach the table stroke end, read the machine coordinates value of each of the table stroke ends 24, 25, 26 and 27 after transferal, and set them to each of the graphic stroke ends 41, 42, 43 and 44, respectively, or set the graphic stroke ends 41, 42, 43 and 44 so as to be located slightly inside each of the table stroke ends 24, 25, 26 and 27, respectively. It is noted, however, that a distance (Lxs) between the machine reference point and the table stroke end in the X-axis direction and a distance (Lys) between the machine reference point and the table stroke end in the Y-axis direction vary with individual machines to a slight extent, and a table stroke (Xst) in the X-axis direction and a table stroke (Yst) in the Y-axis direction vary with individual machines to a slight extent. Accordingly, the graphic stroke (Xgst) in the X-axis direction and the graphic stroke (Ygst) in the Y-axis direction are set to become smaller by several millimeters than the table stroke (Xst) in the X-axis direction and the table stroke (Yst) in the Y-axis direction, respectively, with an error taken into account.

The conventional stroke end checking apparatus for the machine tool of numerical control is designed such that the material to be processed 31 is to be fixed on the processing table with a margin as the processing locus segments 35, 36, 37, 38 and 39 passes in the vicinity of and inside the table stroke ends 24, 25, 26 and 27.

Accordingly, when the material to be processed 31 in a comparably large size is processed to a full extent as large as the effective stroke scope, the position at which the material is mounted on the processing table should be changed often and a longer time is required for preparation work such as settings.

Although the stroke end checking operation on the graphic display screen could overcome the shortcomings presented in the stroke end checking operation by the aid of the program check accompanying the transfer in the axial directions, namely the axial transfer, an accurate stroke end checking operation on the graphic display screen cannot be implemented due to an error (in a usual case, several millimeters) between the table stroke ends 24, 25, 26 and 27 and the graphic stroke ends 41, 42, 43 and 44, respectively. Thus, when the program checking on the graphic display screen is judged to be possible, there has been the risk that the processing locus segments 35, 36, 37, 38 and 39 interfere with the table stroke ends 24, 25, 26 and 27 at the stage of actual processing. In order to ensure a prevention of such interference, it is necessary to implement the program checking operation which accompanies the transfer in axial directions.

SUMMARY OF THE INVENTION

Therefore, the present invention has the object to provide a stroke end checking apparatus for a machine tool of numerical control, which permits an accurate stroke end checking on the graphic display screen without implementing a program checking operation that accompanies a transfer in axial directions and which is designed so as to cause a processing locus to interfere by no means with any table stroke end even at the stage of actual processing.

In order to achieve the object, the present invention consists of a stroke end checking apparatus for a machine tool of numerical control comprising a processing table for holding a material to be processed and capable of being transferred in a two-dimensional direction with respect to a machine reference point with a given stroke; a processing unit for processing the material to be processed; a control unit for controlling a transfer of the processing table in the two-dimensional direction according to a processing program for numerical control so as to process the material with the processing unit; and display means for displaying a stroke end, indicative of a scope within which the processing table can be transferred, and a processing locus by the processing program on a display screen; which is characterized by a limit switch for detecting the stroke end of the processing table; a memory means for storing actual machine coordinates with respect to the machine reference point of the stroke end when the stroke end is detected by the limit switch; and a display means for displaying on the display screen a relationship of the processing locus by the processing program with a position of the stroke end, prior to actual processing, on the basis of the actual machine coordinates stored by the memory means when the stroke end is detected.

The stroke end checking apparatus according to the present invention is further provided with judgment means for judging prior to actual processing whether or not the processing locus by the processing program interfere with the stroke end.

With the structural arrangement as have been briefly described immediately hereinabove, the stroke end checking apparatus according to the present invention enables a graphic stroke end on the display screen to coincide with the table stroke end, thereby permitting a rapid and accurate stroke end checking operation on the graphic screen.

BRIEF DESCRIPTION OF THE DRAWING

Other objects, features and advantages of the present invention will become apparent in the course of the description of the preferred embodiments which follows, with reference to the accompanying drawings.

FIGS. 2A and 2B are flow charts showing a machine coordinates storing routine by the stroke end checking apparatus for the numerical control machine tool according to one example of the present invention.

DETAILED DESCRIPTION OF THE PREFERRED EMBODIMENTS

Figure 1:
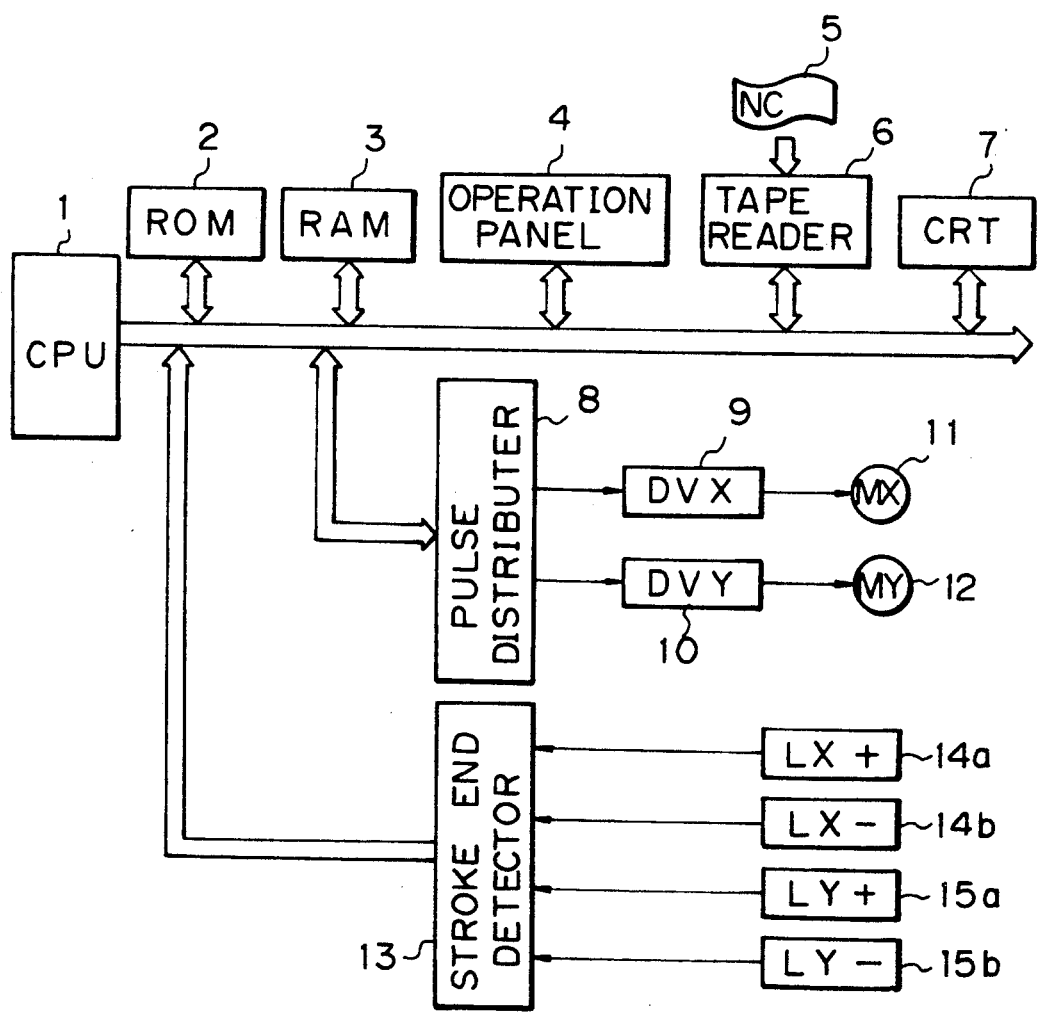
FIG. 1 is a block diagram showing an example of the structure of the stroke end checking apparatus for a machine tool of numerical control, which can be applied to the present invention and to conventional techniques.

FIG. 1 is a block diagram showing an example of the structure of the stroke end checking apparatus of the machine tool of numerical control. The stroke end checking apparatus of numerical control used in this embodiment has substantially the same basic mechanical structure as that of the conventional ones and the same or closely similar elements are provided with the same reference numerals and symbols as the conventional ones, so that a detailed description on these same or closely similar elements will be omitted from the description which follows for brevity of explanation.

Referring again to FIG. 1, the stroke end checking apparatus of the machine tool of numerical control basically comprises a central processing unit 1 for generating an instruction to execute a control program, to analyze a processing program, and to implement desired processing, a storage 2 for storing the control program in order to control a whole system of a processing unit (hereinafter referred to as ROM), a storage 3 for storing the processing program and so on for numerical control (hereinafter referred to as RAM), an operation panel 4 through an operator can provide a control unit with a variety of operations, a tape 5 for numerical control on which the processing program and so on are recorded (NC tape), a tape reader 6 for reading the content recorded on the tape for numerical control 5, and a display unit 7 for displaying the processing program, a variety of numerical data, graphic screens, and so on (hereinafter referred to as CRT). The stroke end checking apparatus is further provided with a pulse distributer 8 for distributing into driving pulses transfer amount in each of axial directions from an operation result of the central processing unit 1, a servo unit 9 in the X-axis direction, a servo unit 10 in the Y-axis direction, a servo motor 11 to be drivable in the X-axis direction by the servo unit 9, and a servo motor 12 to be drivable in the Y-axis direction by the servo unit 10 as well as with a stroke end detector 13 for generating a stroke end detecting signal to a control unit (not shown), in which a limit switch 14a for detecting a stroke end in the X-axis plus direction, a limit switch 14b for detecting a stroke end in the X-axis minus direction, a limit switch 15a for detecting a stroke end in the Y-axis plus direction, and a limit switch 15b for detecting a stroke end in the Y-axis minus direction.

A description which follows is made mainly on the stroke end checking operation.

Figure 2B:
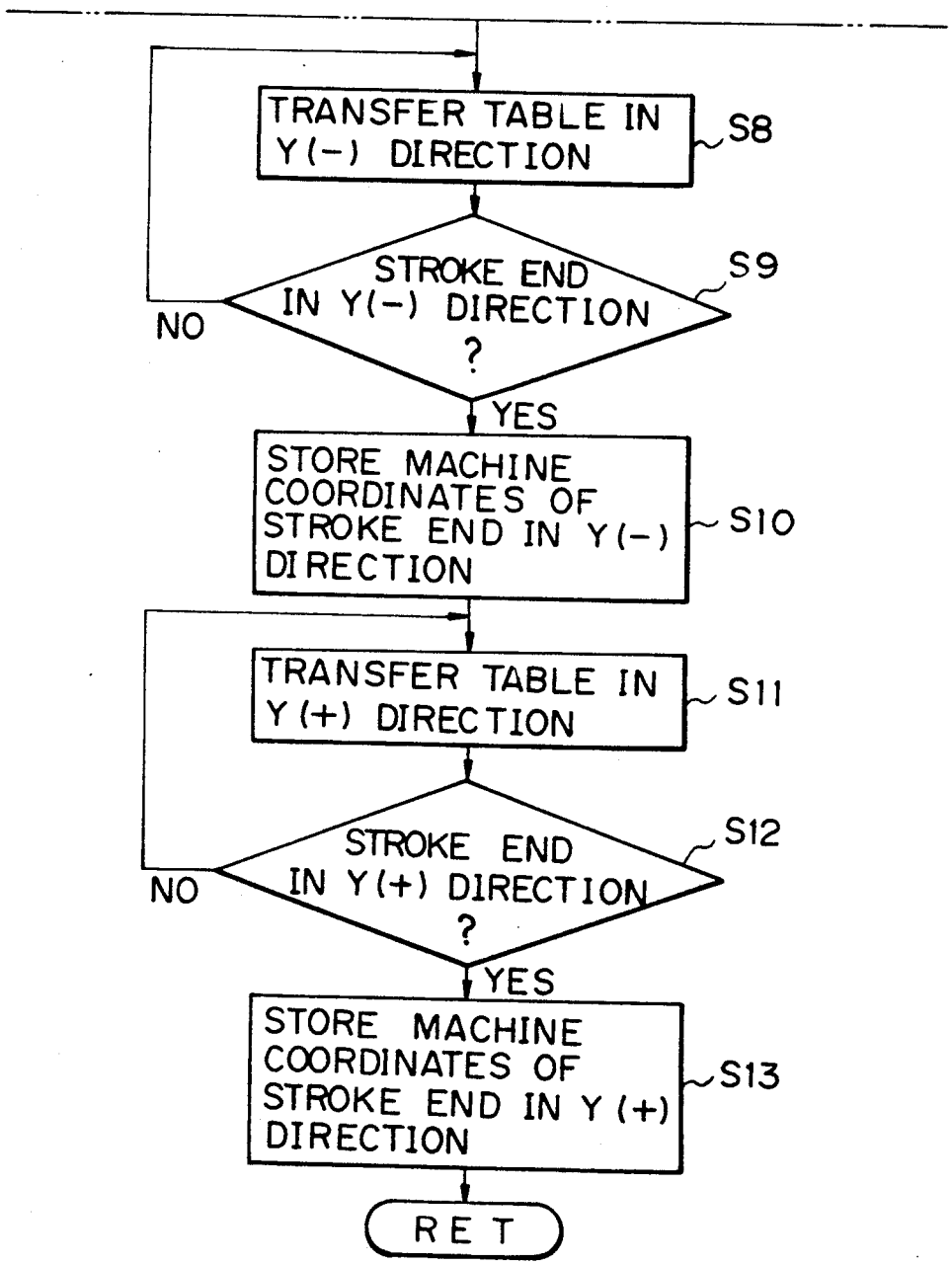

First, when each of the table stroke ends which restrict the scope within which the processing table can be transferred in a two-dimensional direction—namely, in the X-axial direction and in the Y-axial direction, is detected by the limit switches, an actual machine coordinates value with respect to the machine reference point of each of the table stroke ends is stored. This operation will be described hereinafter with reference to FIG. 2 representing the flow chart showing a machine coordinates storing routine by the stroke end checking apparatus for the machine tool of numerical control according to one example of the present invention.

At step S1, an operator operates the control unit manually to return to an original point and the machine reference point 21 functioning as a reference in transferring the processing table is stored in the control unit. Then at step S2, the X-axis is axially transferred in its minus direction by means of the pulse distributor 8 and, at step S3, it is judged whether or not the X-axis has reached the table stroke end 24 in the X-axis minus direction. In other words, the X-axis is transferred until it reaches the table stroke end 24 in the X-axis direction. As it has reached the table stroke end 24 in the X-axis minus direction, the flow then proceeds to step S4 and the corresponding machine coordinate, namely, the X-axial coordinate value, is stored in the control unit. Thereafter, the X-axis is transferred back toward the X-axis plus direction until it reaches the table stroke end 25 in the X-axis plus direction. It is then judged at step S6 whether or not the X-axis has come to the table stroke end 25 in the X-axis plus direction. When it is judged at step S6 that it has reached the table stroke end 25 in the X-axis plus direction, the flow proceeds to step S7 where the corresponding machine coordinate, namely, X-axial coordinate value, is stored in the control unit. Likewise, by the procedure from step S8 to step S10, the Y-axis is axially transferred in the Y-axis minus direction up to the table stroke end 26 and the corresponding machine coordinate (Y-axial coordinate value) is stored in the control unit. A similar operation from step S11 to step S13 stores the machine coordinate (Y-axial coordinate value) corresponding to the table stroke end 27 in the Y-axis plus direction in the control unit.

Figure 4:
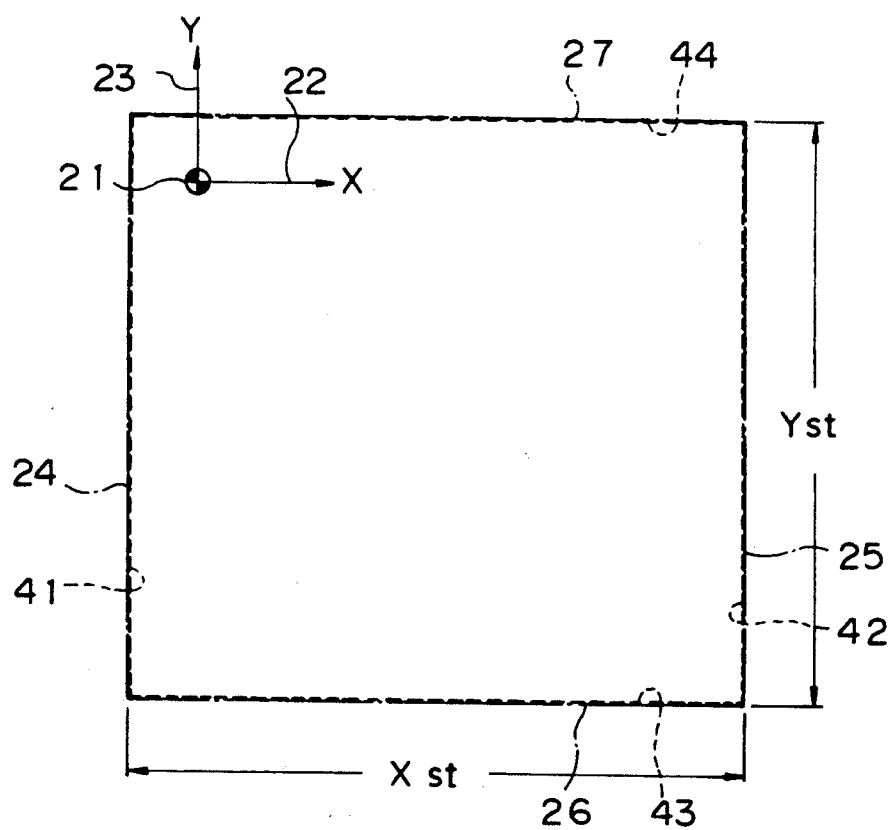
FIG. 4 represents a relationship of the machine coordinates by the stroke end checking apparatus of the numerical control machine tool according to one example of the present invention with positions of the stroke ends and the graphic stroke ends.
Figure 5:
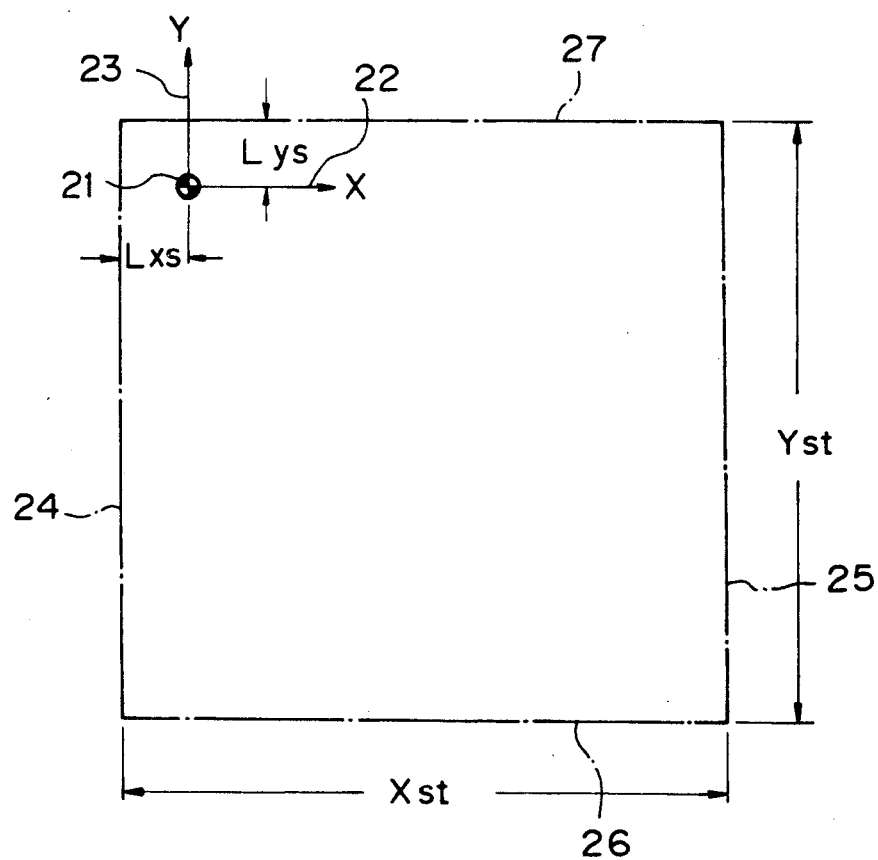
FIG. 5 represents a relationship of the machine coordinates by a conventional stroke end checking apparatus of the numerical control machine tool with positions of the table stroke ends.
Figure 6:
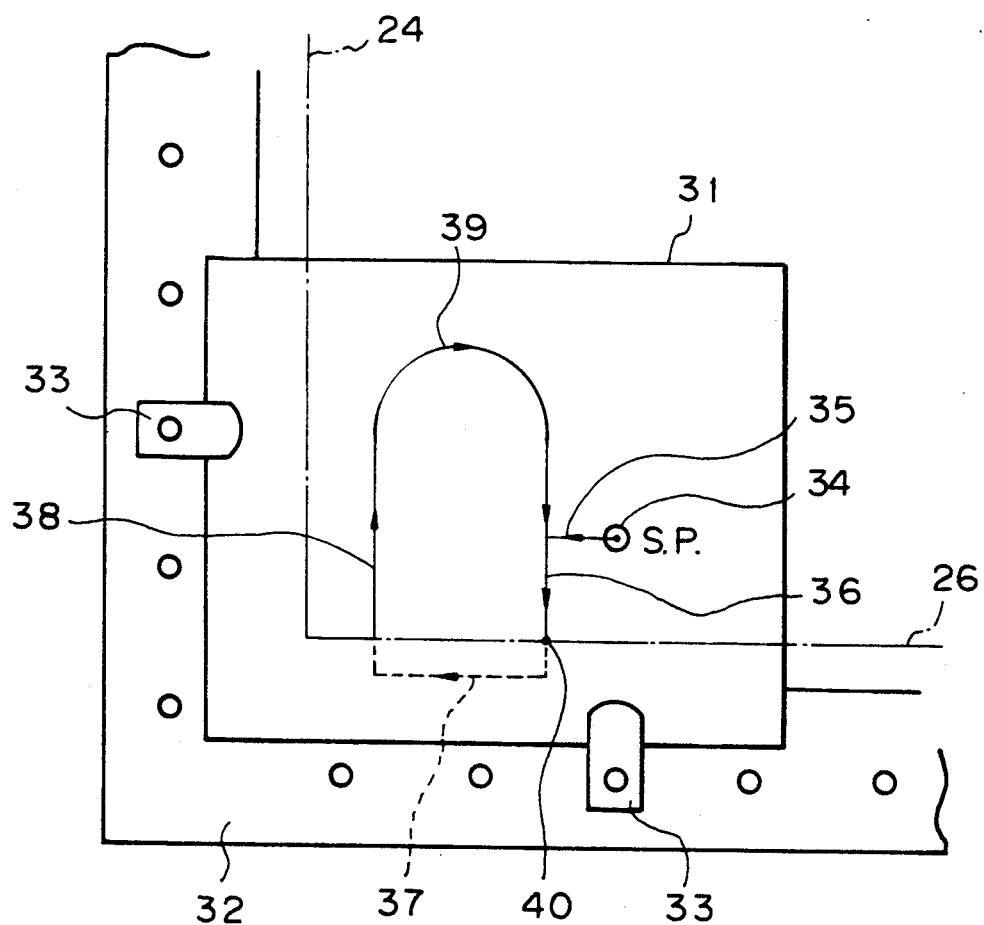
FIG. 6 represents a relationship of a position of the processing material mounted with the processing locus by a conventional stroke end checking apparatus of the numerical control machine tool.
Figure 7:
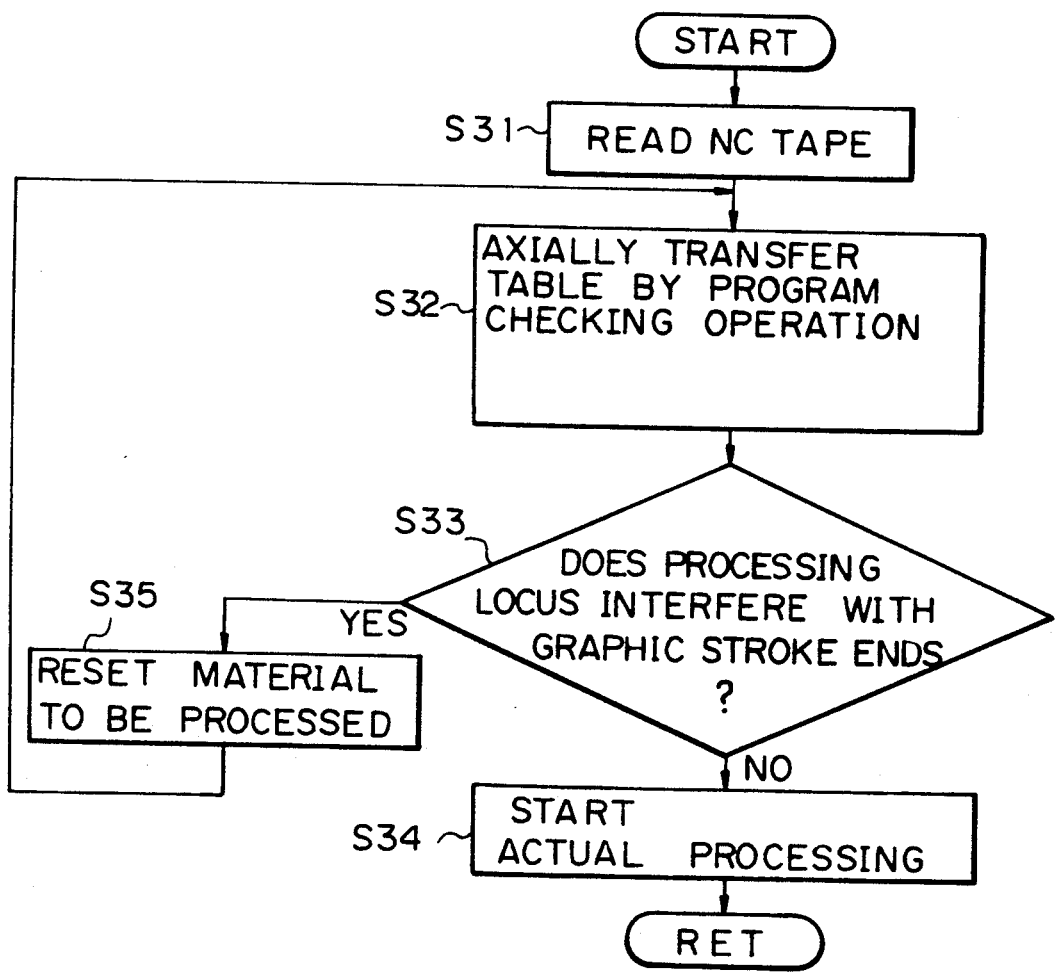
FIG. 7 is a flow chart showing a stroke end checking routine by a conventional stroke end checking apparatus of the numerical control machine tool.
Figure 8:
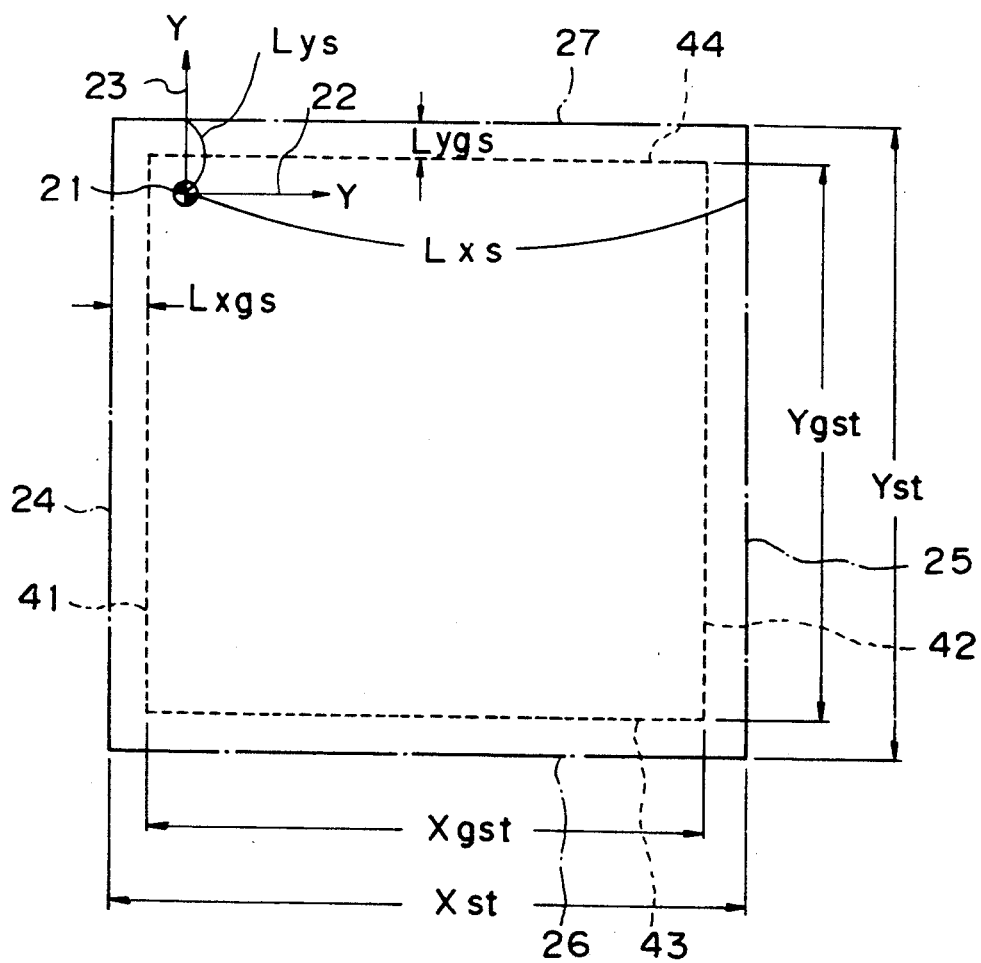
FIG. 8 represents a relationship of machine coordinates by a conventional stroke end checking apparatus of the numerical control machine tool with the stroke ends on a graphic display screen.

When coordinate values of the table stroke ends 24, 25, 26 and 27 stored in a series of the above operation are used as coordinate values of graphic stroke ends, the graphic stroke ends can coincide with the table stroke ends as shown in FIG. 4 representing the relationship of the machine coordinates by the stroke end checking apparatus of the machine tool of numerical control according to the present invention with positions of the table stroke ends and the graphic stroke ends. In the drawings, reference numerals 21 to 27 and 41 to 44, inclusive, as well as reference symbols (Xst) and (Yst) are the same or corresponding elements so that a description on these elements in duplicate will be omitted from the following description for brevity of explanation.

Figure 3:
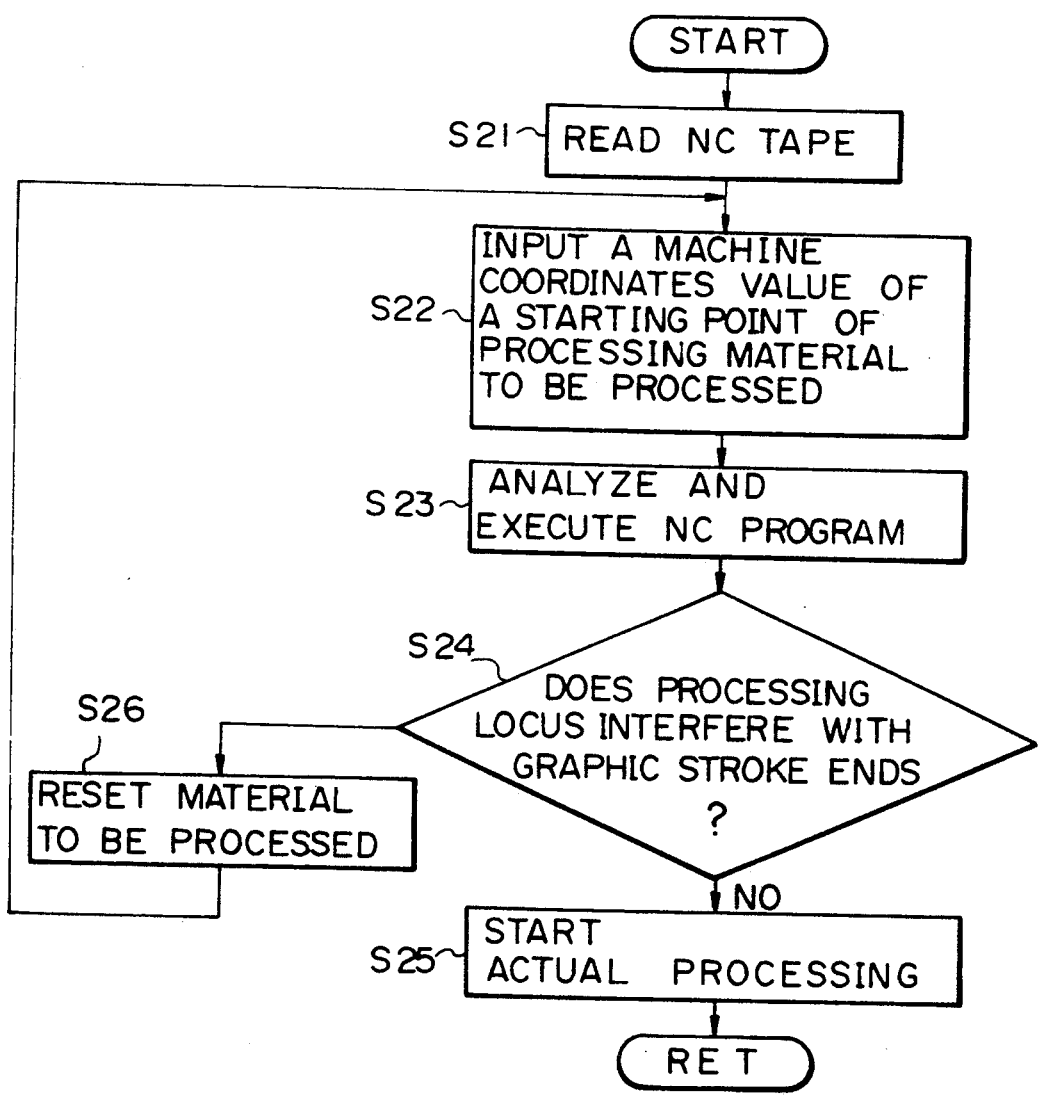
FIG. 3 is a flow chart showing a stroke end checking routine by the stroke end checking apparatus for the numerical control machine tool according to one example of the present invention.

After the actual machine coordinate values of the table stroke ends with respect to the machine reference point are stored, the stroke end checking operation is implemented prior to actual processing on the basis of the machine coordinate values stored. This stroke end checking operation will be described more in detail with reference to FIG. 3 illustrating the flow chart showing a stroke end checking routine by the stroke end checking apparatus of the machine tool of numerical control according to one example of the present invention.

After a material to be processed 31 is fixed on a level block 32 with a clamp 33, contents of the numerical control tape 5 are read by the tape reader 6 at step S21 and machine coordinate values of the starting point for processing the material 31 are inputted in a program checking screen on the display screen of the CRT 7 at step S22. Thereafter, at step S23, a numerical control program for checking stroke ends is analyzed and executed and, at step S24, it is judged whether or not the processing locus interferes with each of the graphic stroke ends 41, 42, 43 and 44, corresponding respectively to the table stroke ends 24, 25, 26 and 27. As it is judged at step S24 that the processing locus does not interfere with any of the graphic stroke ends, the flow proceeds to step S25 and actual processing is caused to start. If it is judged at step S24 that the processing locus interferes with either of the table stroke ends, the material to be processed 31 is fixed again on the level block 2 with the attempt to clear the interference and the flow returns back to step S22 where the stroke end checking operation on the display screen of the CRT 7 is repeated in the same manner as have been described hereinabove. In this case, it is preferred that an extent of extension of the processing locus outside the stroke end can be displayed, whereby this display permits an easy operation of re-positioning of the material 31 in accordance with the extent of extension displayed on the display screen.

As have been described hereinabove, the stroke end checking apparatus of the machine tool of numerical control according to one example of the present invention stores an actual machine coordinates value of each of the table stroke ends with respect to the machine reference point in detecting each of the table stroke ends which restrict a movement of the processing table in a two-dimensional direction and displays the relationship of the processing locus with the positions of the table stroke ends in the two-dimensional direction by the processing program of numerical control prior to actual processing on the basis of the machine coordinates value, thereby implementing the stroke end checking operation.

This enables the graphic stroke ends on the display screen to accurately coincide with the corresponding table stroke ends and permits a rapid and accurate stroke end checking operation on the graphic display screen without implementing the program checking operation as have been conventionally done. Thus, when this is applied to an actual transfer of the processing table, the processing locus of the processing table does not interfere with the table stroke ends, thereby resulting in a highly reliable stroke end checking operation and shortening a reduction of working time required for arrangement prior to actual processing to a significant extent as well as improving working efficiency.

Although the description as have been made hereinabove is directed to an application of the stroke end checking apparatus of the machine tool of numerical control to an electric discharge machine, it is to be noted herein that this stroke end checking apparatus can be applied as a matter of course to a laser beam machine or other machines with substantially the same effects as the electric discharge machine and so on.

In the above embodiment, although the case where the coordinates value of each of the table stroke ends is used as a coordinates value of each of the corresponding graphic stroke ends has been described, the coordinates value of each of the graphic stroke ends may be increased or decreased. For instance, if a coordinates value of a boundary line restricting an effective table stroke region such as a software limit is added to the coordinates value of the graphic stroke ends, effectiveness of this stroke end checking apparatus is increased to an extremely great extent.

Further, the positional relationship of the processing locus by the processing program of numerical control with the positions of the table stroke ends in the two-dimensional directions on the display screen of the CRT 7 may be displayed by numerical data, characters and so on, or an actual transferable region of the processing table and the processing locus of the checking program may be displayed by graphics and so on.

Furthermore, by judging the positional relationship of the processing locus by the processing program of numerical control with the positions of the table stroke ends in the two-dimensional direction by the aid of the judgment means for judging prior to actual processing whether the processing locus by the processing program of numerical control with the table stroke ends in the two-dimensional direction, a correction of the machine coordinates value of the starting point of processing a material to be processed can be made or facilitated by automatic control.

As have been described hereinabove, the stroke end checking apparatus of the machine tool of numerical control according to one example of the present invention stores an actual machine coordinates value of each of the table stroke ends on the basis of the machine reference point in detecting each of the table stroke ends which restrict a movement of the processing table in a two-dimensional direction and displays the relationship of the processing locus with the positions of the table stroke ends in the two-dimensional direction by the processing program of numerical control prior to actual processing on the basis of the machine coordinates value, so that the graphic stroke ends on the display screen are caused to coincide with the corresponding table stroke ends, thereby permitting a rapid and accurate stroke end checking operation on the graphic display screen without the program checking operation and so on and enabling a highly reliable stroke end checking without allowing the processing locus of the processing table to interfere with the table stroke ends at the stage of actual processing. This arrangement can shorten working hour for preparation prior to actual processing and as a consequence improve working efficiency.

What is claimed is:

1. A stroke end checking apparatus for a machine tool of numerical control comprising a processing table for holding a material to be processed and capable of being transferred in a two-dimensional direction with respect to a machine reference point with a given stroke; a processing unit for processing the material to be processed; a control unit for controlling a transfer of the processing table in the two-dimensional direction according to a processing program for numerical control so as to process the material with the processing unit; and display means for displaying stroke ends indicative of a region within which the processing table can be transferred, and a processing locus by the processing program on a display screen; comprising:

limit switch means for detecting the stroke ends of the processing table;

a memory means for storing actual machine coordinate values with respect to the machine reference point of the corresponding stroke ends when the stroke ends are detected by the limit switch means, said machine coordinate values being automatically calculated and stored when said limit switch means detects said stroke ends; and a display means for displaying on the display screen a relationship of the processing locus by the processing program with a position of the stroke ends, prior to actual processing, on the basis of the actual machine coordinate values stored by the memory means when the stroke ends are detected, wherein said stroke ends coincide with outer limits of said processing table.

2. A stroke end checking apparatus as claimed in claim 1, further comprising judgement means for judging prior to actual processing whether or not the processing locus by the processing program interferes with the stroke ends.

3. A stroke end checking apparatus as claimed in claim 1 or 2, wherein the control unit moves the processing table in a direction parallel to a X-axis and thereafter parallel to an Y-axis until the limit switch means detects positive and negative stroke ends for each movement direction and the memory means stores each of the machine coordinate values representing actual stroke ends in X-axis minus and plus directions and in Y-axis minus and plus directions.

4. A stroke end checking apparatus as claimed in claim 1, further comprising a servo motor for driving the processing table in a two-dimensional direction, said servo motor being drivable by means of a pulse to be supplied from a pulse distributer.

5. A stroke end checking apparatus as claimed in claim 1, wherein the display means for displaying the relationship of the processing locus by the processing program with the stroke ends on the display screen comprises a CRT.

6. A stroke end checking apparatus as claimed in claim 1, wherein the machine tool of numerical control comprises an electric discharge machine.

7. A stroke end checking apparatus as claimed in claim 1, wherein the machine tool of numerical control comprises a laser beam machine.

8. A stroke end checking apparatus as claimed in claim 1, wherein the processing table is provided with a clamp to which the material to be processed is fixed detachably.

9. A stroke end checking apparatus as claimed in claim 1, wherein any of the machine coordinate values of the stroke ends displayed on the display screen are arbitrarily increased or decreased.

10. A stroke end checking apparatus as claimed in claim 1, wherein a coordinates value of a boundary line restricting an effective table stroke region is added to the machine coordinates value of one of the stroke ends displayed on the display screen.

11. A stroke end checking apparatus as claimed in claim 1, wherein the relationship of the processing locus of the processing program with a table stroke end of the processing table is displayed by graphics on the display screen.

12. A stroke end checking apparatus as claimed in claim 1, wherein the relationship of the processing locus of the processing program with a table stroke end of the processing table is displayed by numerical data or characters on the display screen.

13. A stroke end checking apparatus as claimed in claim 2, wherein the relationship of the processing locus of the processing program with a table stroke end of the processing table is judged by the judgment means for judging prior to actual processing whether or not the processing locus by the processing program interferes with the stroke ends prior to actual processing and a correction of the machine coordinate value of a starting point of processing the material to be processed is implemented by automatic control.

14. A stroke end checking apparatus as claimed in claim 2, wherein the relationship of the processing locus of the processing program with table stroke ends of the processing table is judged by the judgment for judging prior to actual processing whether or not the processing locus by the processing program interferes with the stroke ends prior to actual processing and a correction of the machine coordinate value of a starting point of processing the material to be processed is facilitated to be implemented by automatic control.

* * * * *